United States Patent [19]

Bajeux

[11] 4,289,336

[45] Sep. 15, 1981

[54] PIPE SWIVEL JOINT FOR A PLURALITY OF SEPARATE FLUIDS

[75] Inventor: Etienne Bajeux, Saligny, France

[73] Assignee: FMC Corporation, San Jose, Calif.

[21] Appl. No.: 23,815

[22] Filed: Mar. 26, 1979

[30] Foreign Application Priority Data

Apr. 6, 1978 [FR] France ................... 78 10218

[51] Int. Cl.³ ............................................. F16L 39/04
[52] U.S. Cl. ..................................... 285/136; 285/272
[58] Field of Search .................... 285/136, 272; 9/8 P; 141/387

[56] References Cited

U.S. PATENT DOCUMENTS

| | | |
|---|---|---|
| 2,894,268 | 7/1959 | Griebe . |
| 3,082,440 | 3/1963 | Rhedin . |
| 3,237,220 | 3/1966 | Brandt . |
| 3,698,433 | 10/1972 | Dobler et al. ................ 285/136 X |
| 3,942,204 | 3/1976 | Gruy . |
| 3,945,066 | 3/1976 | Davies . |
| 4,052,090 | 10/1977 | Stafford ........................ 285/136 X |
| 4,111,467 | 9/1978 | de Fremery . |
| 4,138,751 | 2/1979 | Kentosh . |
| 4,183,559 | 1/1980 | Stafford et al. ................... 285/136 |

Primary Examiner—Thomas F. Callaghan

Attorney, Agent, or Firm—L. B. Guernsey; W. W. Ritt, Jr.

[57] ABSTRACT

A pipe swivel joint for simultaneous transfer of a plurality of separated fluids between a plurality of inlet conduits and a plurality of corresponding outlet conduits. The swivel joint includes an annular inner element, an annular outer element surrounding at least a part of the inner element, and a plurality of annular fluid flow passages formed between the outer surface of the inner element and the inner surface of the outer element. Each of the inlet conduits is connected to the portion of a corresponding one of the flow passages that is defined by the outer surface of the inner element, and each of the outlet conduits is connected to the portion of a corresponding one of the flow passages that is defined by the inner surface of the outer element. The cross-sectional configuration of each of the fluid flow passages is preferably circular in order to allow passage of spherical or round cleaning elements through them, and an annular bearing race chamber, defined by the outer surface of the inner element and the inner surface of the outer element, contains a plurality of ball bearings to facilitate rotational movement of the outer element relative to the inner element.

9 Claims, 7 Drawing Figures

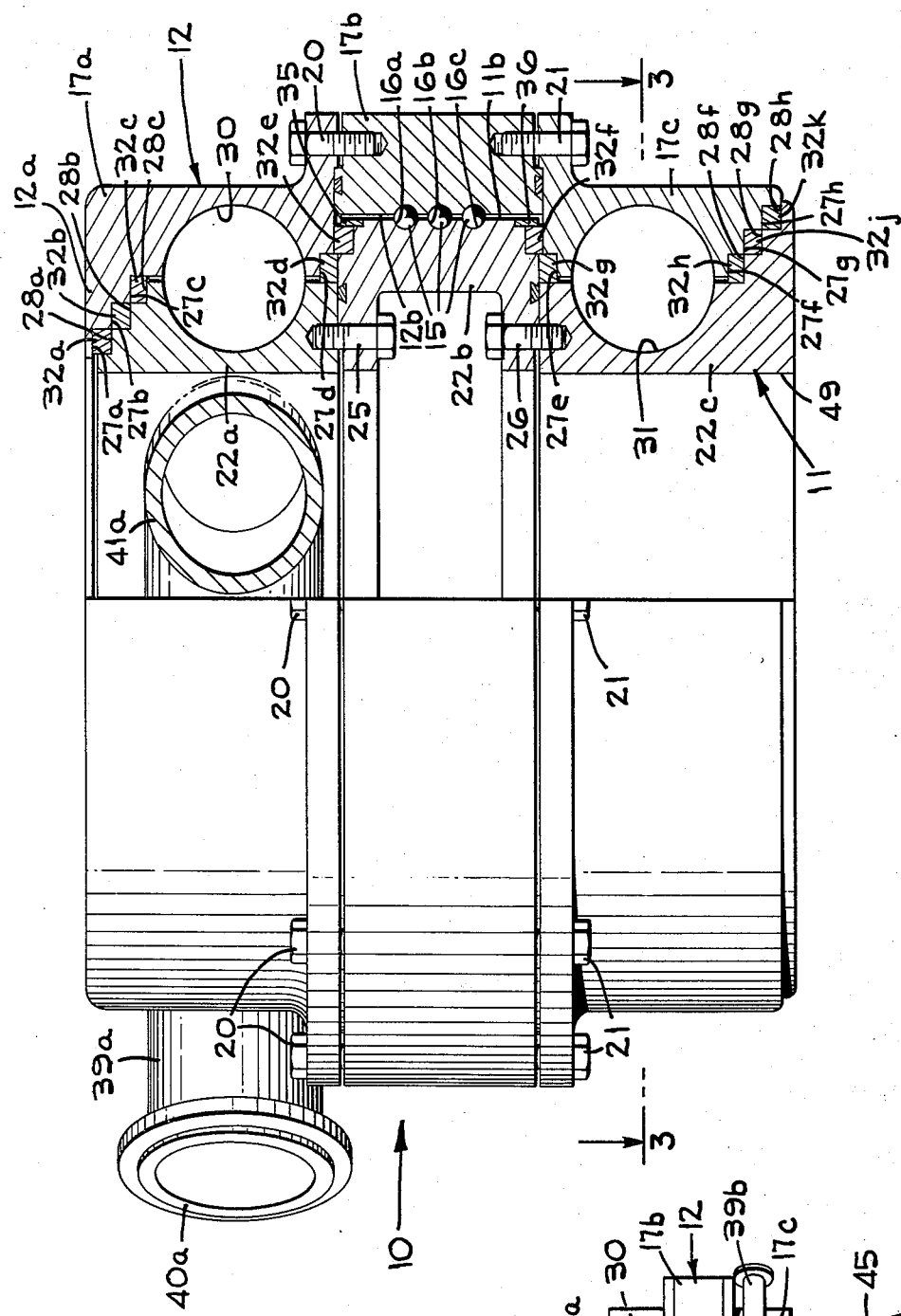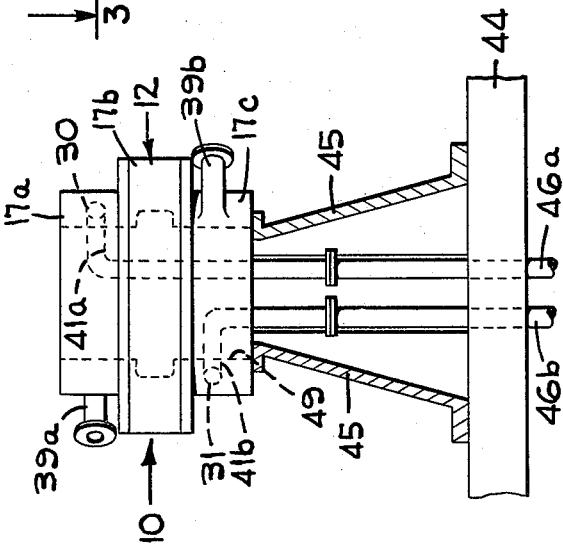

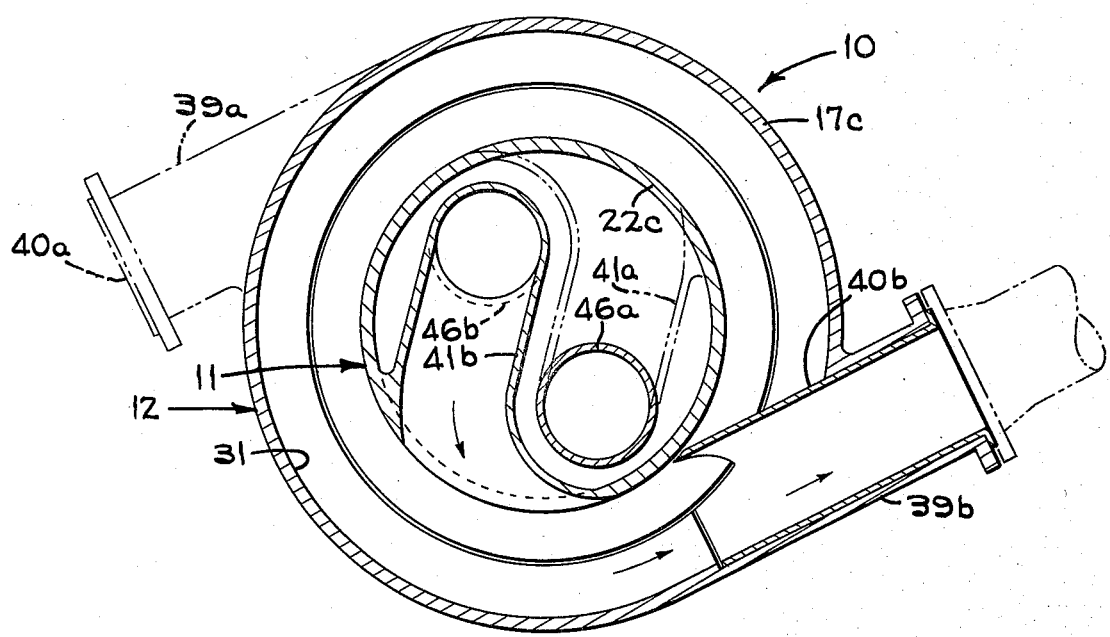
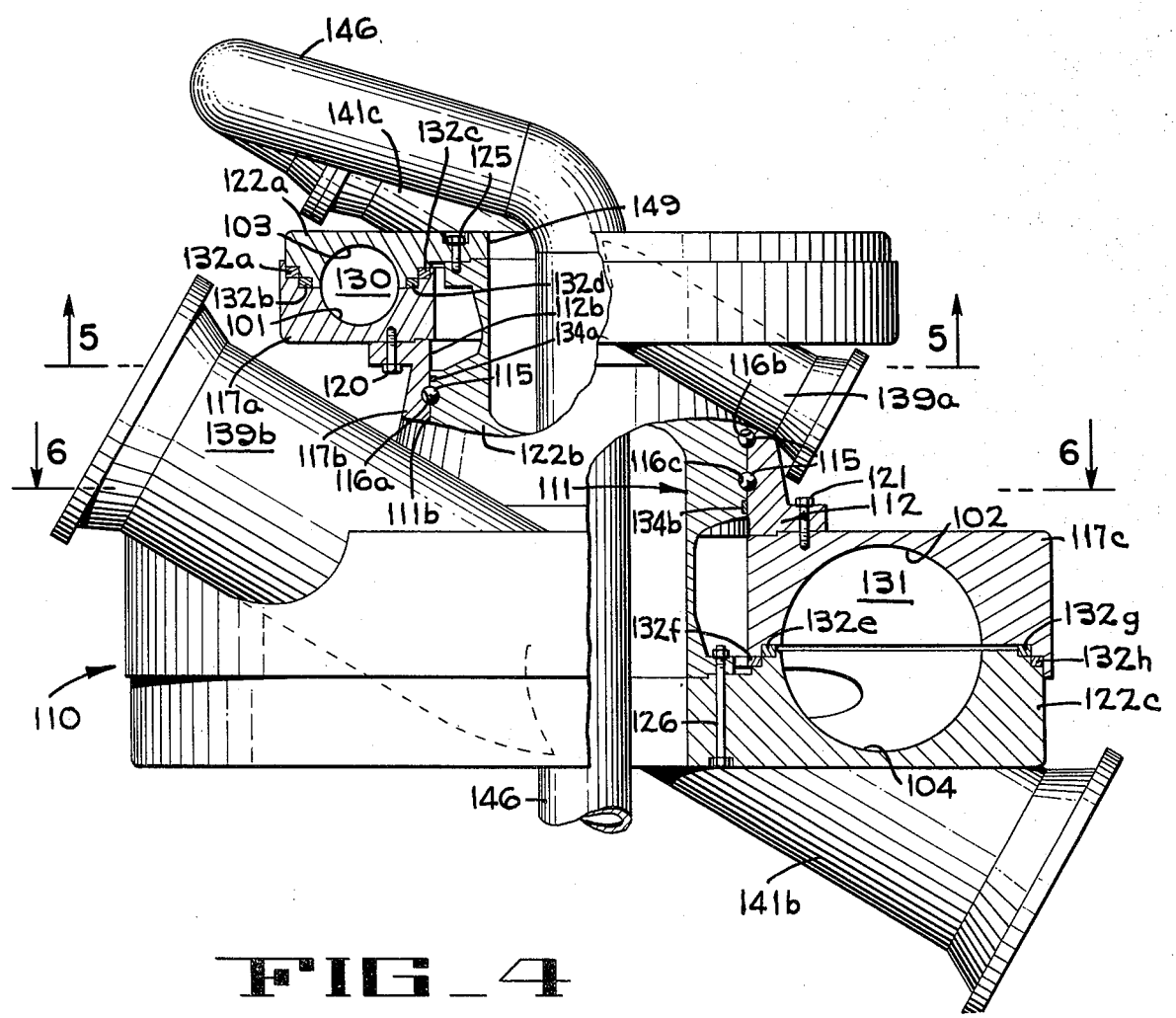

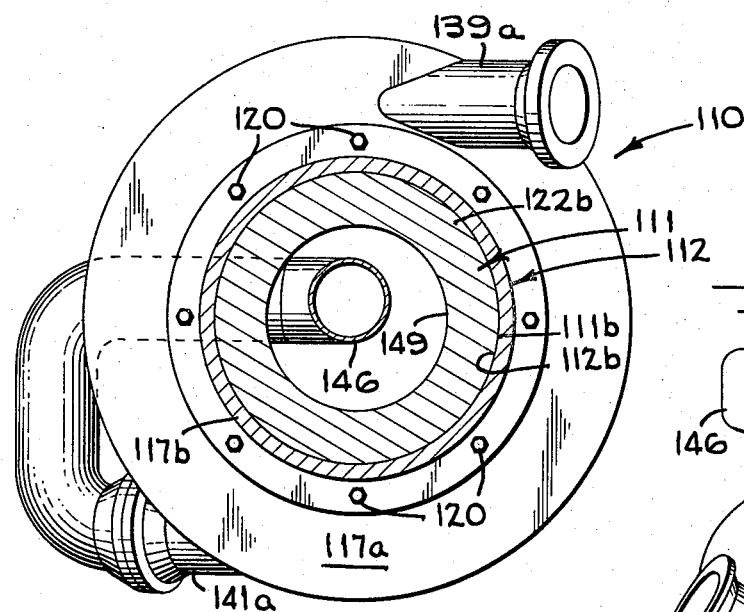
FIG_5
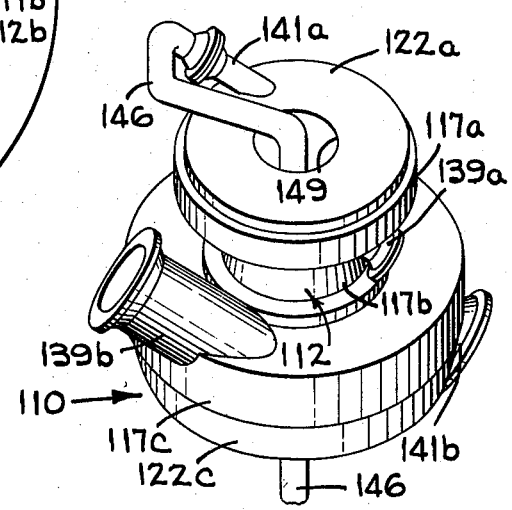
FIG_7
FIG_6
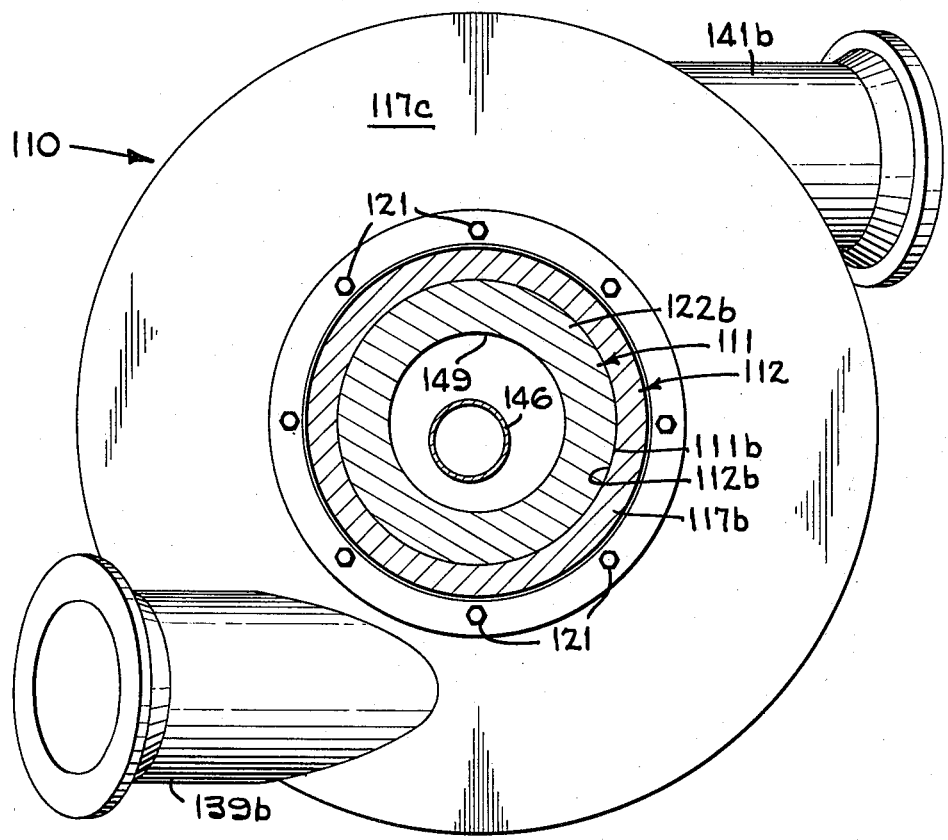

PIPE SWIVEL JOINT FOR A PLURALITY OF SEPARATE FLUIDS

BACKGROUND OF THE INVENTION

1. Field of the Invention

This invention relates to pipe swivel joints, and more particularly to such swivel joints with multiple flow passageways for the simultaneous transfer of a plurality of separate fluids.

2. Description of the Prior Art

The production of oil and gas from offshore wells has developed into a major endeavor of the petroleum industry, and this growth has led to the development of various means for transporting petroleum and its products from offshore locations to shore-based refineries or storage facilities. Many of these wells now are being drilled and completed in deep water where the use of marine tankers of very large capacity constitutes the most practical and efficient transportation method.

One of the more common facilities employed in such a tanker operation is an offshore floating terminal comprising an arrangement of hoses, pipes and/or other fluid conduits supported on a buoy to which the tanker is moored during loading/unloading. The tanker and the buoy move relative to each other in response to the influence of wind, tide, water currents and the loading or unloading of cargo or fuel, thus requiring a flexible hose or articulated pipe with swivel joints between the tanker and the buoy. As the loading/unloading operation frequently involves more than one type of fluid, for example, crude oil, kerosene, and bunker fuel, and sometimes large volumes of vapor generated during the transfer operation must be conducted to a storage or recovery facility, the several fluids are loaded or unloaded, either one at a time through a single conduit or simultaneously through a plurality of conduits all of which are connected to a single, multiple-conduit coaxial swivel joint on the buoy. This type of swivel joint has two or more interconnected chambers each communicating with an inlet and a corresponding outlet to provide two or more separate and distinct flow paths, and although such devices provide the desired function they are relatively complex and thus difficult and expensive both to manufacture and to service.

What is needed, therefore, is a coaxial swivel joint that has a plurality of separate and distinct fluid flow passages between a plurality of inlets and a plurality of outlets, that is relatively uncomplex in design and thus inexpensive to manufacture, and that is easy to clean and maintain.

SUMMARY OF THE INVENTION

The present invention comprises an improved pipe swivel joint for simultaneously transferring a plurality of separated fluid compositions from a plurality of inlet conduits to a plurality of outlet conduits. A swivel joint according to this invention includes an annular inner element, an annular outer element surrounding and coaxial with the inner element, and an annular bearing race chamber, defined by the outer surface of the inner element and the inner surface of the outer element, containing a plurality of ball or other suitable rollable bearings to facilitate rotational movement of the outer element relative to the inner element. Such a swivel joint also includes a plurality of annular fluid flow passages each defined by the outer surface of the inner element and by the inner surface of the outer element, an inlet conduit connected to the portion of a corresponding one of the flow passages that is defined by the outer surface of the inner element, and an outlet conduit connected to the portion of the corresponding one of the flow passages that is defined by the inner surface of the outer element. Each of the fluid flow passages includes annular seals at each of the junctions of the inner and the outer elements to prevent leakage of fluid at these junctions, and the preferred cross-sectional configuration of these flow passages is round in order to accommodate a spherical or otherwise round-shaped cleaning element, such as a pipe-line pig.

BRIEF DESCRIPTION OF THE DRAWINGS

FIG. 1 is a side elevation of a pipe swivel joint having multiple flow passageways according to the present invention, with the swivel joint being mounted on a support platform.

FIG. 2 is an enlarged side elevation, partly in section, showing details of the pipe swivel joint of FIG. 1.

FIG. 3 is a horizontal section of the pipe swivel joint, taken along the line 3—3 of FIG. 2.

FIG. 4 is a side elevation, partly in section, of another embodiment of a pipe swivel joint according to the present invention.

FIG. 5 is a horizontal section of the pipe swivel joint, taken along the line 5—5 of FIG. 4.

FIG. 6 is a horizontal section of the pipe swivel joint, taken along the line 6—6 of FIG. 4.

FIG. 7 is an isometric view, on a reduced scale, of the pipe swivel joint of FIGS. 4-6 showing the joint connected to a length of metal pipe.

DESCRIPTION OF THE PREFERRED EMBODIMENT

A pipe swivel joint 10 having multiple flow passages according to the present invention comprises an annular inner or male element 11 (FIGS. 1-3), an annular outer or female element 12 surrounding and coaxial with the inner element 11, and a bearing system such as a plurality of ball or other suitable rollable bearings 15 (FIG. 2) that rotatably interconnect the inner and outer element 11, 12. The bearings 15 are mounted in rows in a plurality of raceways 16a–16c formed in the outer surface 11b of the inner element 11, and in the inner surface 12b of the outer element 12. The outer element 12 includes a plurality of annular elements 17a–17c rigidly connected together by a plurality of capscrews 20,21 or other suitable connecting means. The uppermost element 17a includes a radially inward extending flange 12a at the top (FIG. 2) of the pipe swivel joint 10, with the upper element 17a having a series of shoulders 27a–27d, and the lower element 17c having a plurality of shoulders 27e–27h.

The inner element 11 (FIG. 2) includes a plurality of annular elements 22a–22c rigidly connected together by a plurality of capscrews 25,26 or other suitable connecting means. The lower element 22c includes a plurality of shoulders 28f–28h adjacent the shoulders 27f–27h, and the upper element 22a includes a plurality of shoulders 28a–28c adjacent the shoulders 27a–27c. A pair of annular fluid flow passages 30,31 are formed in the inner surface of the outer element 12 and in the outer surface of the inner element 11. Between the upper end of the element 17a and the fluid flow passages 30 are a plurality of outer dynamic annular resilient sealing members 32a–32c to retain the liquid product in the swivel joint's fluid flow passage 30.

Between the fluid flow passage 30 and the bearing raceway 16a are a pair of sealing members 32d, 32e to prevent fluid from flowing from the fluid flow passage into the bearing raceways. The sealing member 32e is retained securely in position against the element 22b by an annular metal ring 35.

Between the fluid flow passage 31 and the raceway 16c are a pair of annular dynamic sealing members 32f, 32g to prevent fluid from the fluid flow passage 31 from flowing into the bearing raceways. The sealing member 32f is retained securely in position against the element 22b by an annular metal ring 36.

Between the fluid flow passage 31 and the lower end of the pipe swivel joint 10 are a plurality of annular dynamic resilient sealing members 32h, 32j and 32k to retain fluid in the fluid flow passage 31.

A pair of fluid outlet conduits 39a, 39b (FIGS. 1 and 3) extend through the outer element 12 into a corresponding one of the fluid flow passages 30, 31, and a pair of fluid inlet conduits 41a, 41b (FIGS. 1 and 3) extend through the inner element 11 into a corresponding one of the fluid flow passages 30, 31. An inner extension 40b (FIG. 3) of the outlet conduit 39b directs the flow of fluid and cleaning balls or other round-shaped cleaning elements coming from the inlet conduit 41b and the passage 31 into and out through the outlet conduit 39b. The outlet conduit 39a is similar to the outlet conduit 39b, having an extension 40a that directs the flow of fluid and cleaning elements from the upper flow passage 30 into and out of said conduit 39a.

In operation, the swivel joint 10 is mounted on a buoy or other floating support means 44 (FIG. 1) by a plurality of support brackets 45 connected between the annular inner element 11 and the buoy 44. A pair of supply conduits 46a, 46b extends from a storage container (not shown) upward through the buoy 44 (FIG. 1) and through a bore 49 in the inner element 11 (FIGS. 1-3) to a corresponding inlet conduit 41a, 41b. The inner element 11 is fixed to the buoy 44 and to the fluid inlet conduits 41a, 41b, and does not move relative to the buoy, while the outer element 12 and the fluid outlet conduits 39a, 39b are free to rotate about the inner element to direct the outlet conduits 39a, 39b in any desired direction radially away from the pipe swivel joint 10. Fluid is transferred from the storage container up through the supply conduit 46a (FIGS. 1 and 3), through the fluid inlet conduit 41a to the passage 30 (FIG. 2), and thence out through the outlet conduit 39a. Other fluid can be simultaneously and separately transferred from another storage container, up through the supply conduit 46b and the fluid inlet conduit 41b (FIG. 1) to the fluid passage 31 (FIG. 2), and thence out through the outlet conduit 39b. Spherical or round-shaped cleaning balls can be sent through each of the paths between an inlet conduit and the corresponding outlet conduit when cleaning of the conduits and flow passages is needed.

When it is desired to transfer more than two separate fluids simultaneously along more than two separate and distinct paths through the swivel joint, additional fluid flow passages, similar to the passages 30, 31 (FIG. 2), can be included between the inner element 11 and the outer element 12 by increasing the height of the swivel joint 10. Additional annular grooves, each having a semi-circular cross-section similar to passages 30, 31, are formed in the walls of the inner and outer elements 11, 12, additional inlet conduits are connected to the passages through the inner element 11, and additional outlet conduits are connected to the passages through the outer element 12. Of course, additional sealing members would be included between the present passages and each of the additional passages to prevent intermixing of the several fluids.

A second embodiment 110 of the present invention is illustrated in FIGS. 4-7. This embodiment differs from that of FIGS. 1-3 by the inclusion of fluid flow passages of different cross-sectional size, instead of the equal-sized flow passages disclosure in FIGS. 1-3. The multiple product pipe swivel joint 110 comprises an inner element 111, as best seen in FIG. 4, an outer element 112 at least partially surrounding and coaxial with the inner element 111, and a bearing system which includes a plurality of ball or other suitable rotatable bearings 115 that rotatably interconnect the inner and outer elements 111, 112. The bearings 115 are mounted in rows in a plurality of raceways 116a–116c formed in the outer surface 111b of the inner element 111 and in the inner surface 112b of the outer element 112.

The outer element 112 comprises a plurality of elements 117a–117c rigidly connected together by a plurality of capscrews 120, 121 or other suitable connecting means. The upper element 117a includes a radial flange having an annular groove 101 of semicircular cross-section in its upper face, and the lower element 117c includes a radial flange with an annular groove 102 of semicircular cross-section in its lower face.

The inner element 111 comprises a plurality of elements 122a–122c likewise rigidly connected together by a plurality of capscrews 125 and bolts 126 or other suitable connecting means. The upper element 122a includes a radial flange with an annular groove 103 of semi-circular cross-section in its lower face, and the lower element 122c includes a radial flange with an annular groove 104 of semi-circular cross-section in its upper face.

As seen in FIG. 4, the walls of the grooves 101 and 103 cooperate to form a fluid flow passage 130, and the walls of the grooves 102 and 104 likewise cooperate to form another fluid flow passage 131. Between the upper elements 122a and 117a is a plurality of dynamic annular resilient sealing members 132a–132d (FIG. 4) to retain fluid in the swivel joint's flow passage 130, and in similar fashion between the lower elements 117c and 122c is another plurality of dynamic annular resilient sealing members 132e–132h to retain fluid in the swivel joint's flow passage 131. A pair of bearing seals 134a, 134b retain lubrication in the raceways 116a–116c, and also prevent dirt and other contaminants from entering these raceways.

A fluid conduit outlet 139a (FIGS. 4 and 5) extends through the element 117a into the lower portion of the fluid flow passage 130, and a fluid inlet conduit 141a extends through the element 122a into the upper portion of this passage 130. A supply conduit 146 extends upward through a bore 149 (FIGS. 4-7) and is connected to the inlet conduit 141a. Another fluid outlet conduit 139b extends through the element 117c into the upper portion of the fluid flow passage 131, and a fluid inlet conduit 141b extends through the element 122c into the lower portion of the passage 131. The outer element 112 and the fluid outlet conduits 139a, 139b are free to rotate about the inner element 111 to direct the output conduit 139a, 139b in any desired direction radially away from the pipe swivel joint 110.

The present invention provides a relatively inexpensive and reliable pipe swivel joint which can simultaneously provide several separate and distinct paths between a plurality of inlet conduits and a corresponding plurality of outlet conduits.

Although the best mode contemplated for carrying out the present invention has been herein shown and described, it will be apparent that modification and variation may be made without departing from what is regarded to be the subject matter of the invention.

What is claimed is:

1. A swivel joint for connecting an inlet conduit with an outlet conduit, said joint comprising:
   an annular inner element having a radial flange which includes an annular groove in its upper face;
   an annular outer element at least partially surrounding said inner element, said outer element having a radial flange which includes an annular groove in its lower face;
   an annular bearing race chamber defined by the outer surface of said inner element and the inner surface of said outer element;
   bearing means mounted in said race chamber to facilitate rotational movement of said outer element relative to said inner element;
   an annular fluid flow passage defined by the annular groove in the upper face of said flange of said inner element and the annular groove in the lower face of said flange of said outer element, the diameter of said flange faces defining said fluid flow passages being larger than the diameter of the inner and outer surfaces defining said bearing race chamber;
   means for connecting said inlet conduit to the portion of said flow passage that is defined by the upper face of said flange of said inner element;
   means for connecting said outlet conduit with the portion of said flow passage that is defined by the lower face of said flange of said outer element; and
   means for sealing the fluid flow passage at the junction of said inner element and said outer element.

2. A swivel joint as defined in claim 1 wherein said fluid flow passage includes a generally circular cross-section to facilitate the passage of spherical cleaning balls through said fluid flow passage.

3. A swivel joint as defined in claim 2 including means for guiding the direction of travel of said cleaning balls through said fluid flow passage.

4. A swivel joint for simultaneous transfer of a plurality of separated fluids between a plurality of inlet conduits and a plurality of corresponding outlet conduits, said joint comprising:
   an annular inner element having at least one radial flange including a plurality of annular grooves in flange faces thereof;
   an annular outer element at least partially surrounding said inner element, said outer element having at least one radial flange including a plurality of annular grooves in flange faces thereof;
   an annular bearing race chamber defined by the outer surface of said inner element and the inner surface of said outer element;
   bearing means mounted in said race chamber to facilitate rotational movement of said outer element relative to said inner element;
   a plurality of annular fluid flow passages each defined by the annular groove in the face of said radial flange of said inner element and the annular groove in the face of said radial flange of said outer element, said fluid flow passages each having a central diameter greater than the central diameter of said bearing race chamber;
   means for connecting each of said inlet conduits to the portion of a corresponding one of said flow passages that is defined by the face of said flange of said inner element;
   means for connecting each of said outlet conduits to the portion of a corresponding one of said flow passages that is defined by the face of said flange of said outer element; and
   means for sealing each of the fluid flow passages at the junctions of said inner element and said outer element.

5. A swivel joint as defined in claim 4 wherein each of said fluid flow passages and each of said inlet conduits and said outlet conduits includes a generally circular cross-section to facilitate the passage of spherical cleaning balls through said conduits and through said fluid flow passages.

6. A swivel joint as defined in claim 4 wherein each of said outlet conduits is connected to said outer element and rotates about said inner element as said outer element rotates, and each of said inlet conduits is connected to said inner element.

7. A swivel joint as defined in claim 4 wherein each of said outlet conduits is connected with the walls of said conduit tangential to the connecting walls of said fluid flow passage.

8. A swivel joint as defined in claim 4 wherein said inner element includes an axial bore having said inlet conduits extending from said inner element axially through said bore.

9. A swivel joint as defined in claim 4 including means for guiding the direction of travel of said fluid through each of said fluid flow passages.

* * * * *